(12) United States Patent
Patnaik

(10) Patent No.: US 11,436,130 B1
(45) Date of Patent: Sep. 6, 2022

(54) SYSTEM, METHOD, AND COMPUTER PROGRAM FOR AUTOMATING MANUALLY WRITTEN TEST CASES

(71) Applicant: Amdocs Development Limited, Limassol (CY)

(72) Inventor: Partha Patnaik, Pune (IN)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 16/941,401

(22) Filed: Jul. 28, 2020

(51) Int. Cl.
*G06F 11/36* (2006.01)

(52) U.S. Cl.
CPC ...... *G06F 11/3684* (2013.01); *G06F 11/3608* (2013.01)

(58) Field of Classification Search
None
See application file for complete search history.

(56) References Cited

U.S. PATENT DOCUMENTS

| | | | |
|---|---|---|---|
| 9,047,414 B1 * | 6/2015 | Matyjek | G06F 11/3692 |
| 9,262,404 B2 | 2/2016 | Ingram et al. | |
| 9,710,367 B1 * | 7/2017 | Nagineni | G06F 11/3684 |
| 9,934,136 B2 | 4/2018 | Crawshay et al. | |
| 10,114,738 B2 | 10/2018 | Dsouza | |
| 10,509,718 B2 | 12/2019 | Venkatasubramanian et al. | |
| 2016/0044520 A1 * | 2/2016 | Iyer | H04W 24/08 370/252 |
| 2016/0188448 A1 * | 6/2016 | Sankaranarasimhan | G06F 8/70 717/128 |
| 2018/0260310 A1 * | 9/2018 | Vorganti | G06F 11/3684 |
| 2018/0349256 A1 | 12/2018 | Fong | |
| 2019/0179732 A1 * | 6/2019 | Venkatasubramanian | G06F 8/10 |
| 2019/0266076 A1 * | 8/2019 | Maliani | G06F 11/3684 |
| 2020/0019488 A1 * | 1/2020 | Singh | G06N 3/08 |
| 2020/0073686 A1 * | 3/2020 | Hanke | G06F 11/368 |

(Continued)

OTHER PUBLICATIONS

R. Diouf, E. N. Sarr, O. Sall, B. Birregah, M. Bousso and S. N. Mbaye, "Web Scraping: State-of-the-Art and Areas of Application," 2019 IEEE International Conference on Big Data (Big Data), 2019, pp. 6040-6042, doi: 10.1109/BigData47090.2019.9005594. (Year: 2019).*

(Continued)

*Primary Examiner* — Andrew M. Lyons
(74) *Attorney, Agent, or Firm* — Zilka-Kotab, P.C.

(57) ABSTRACT

As described herein, a system, method, and computer program are provided for automating manually written test cases. In use, a web scraper is used to scrape an application to be tested, wherein the scraping identifies elements of the application. Additionally, a repository is used to store an indication of the elements of the application identified from the scraping of the application. Further, a test case manually written for the application is accessed. One or more of the elements of the application indicated in the repository that are impacted by the manually written test case are then determined. Still yet one or more of the preconfigured test functions that correspond with the one or more of the elements of the application are selected from a library of preconfigured test functions. Moreover, the manually written test case is automated, to form an automated test case, using the selected one or more of the preconfigured test functions.

17 Claims, 5 Drawing Sheets

(56) References Cited

U.S. PATENT DOCUMENTS

| | | | |
|---|---|---|---|
| 2020/0104247 A1* | 4/2020 | Raghavan | G06F 40/30 |
| 2020/0356466 A1* | 11/2020 | Thangam | G06N 20/00 |
| 2022/0138088 A1* | 5/2022 | Shang | G06F 11/3684 |
| | | | 717/124 |

OTHER PUBLICATIONS

R. Gupta and N. Bajpai, "A Keyword-Driven Tool for Testing Web Applications (KeyDriver)," in IEEE Potentials, vol. 33, No. 5, pp. 35-42, Sep.-Oct. 2014, doi: 10.1109/MPOT.2012.2202135. (Year: 2014).*

Boddu et al., "RETNA: From Requirements to Testing in a Natural Way," IEEE International Requirements Engineering Conference, 2004, 17 pages.

\* cited by examiner

SYSTEM, METHOD, AND COMPUTER PROGRAM FOR AUTOMATING MANUALLY WRITTEN TEST CASES

FIELD OF THE INVENTION

The present invention relates to automating tests for software.

BACKGROUND

Testing is a common phase in software application development, and is generally used prior to distribution of the software in order to ensure that a developed software application executes without errors, failures, etc. Initially, testing was performed in an entirely manual manner, with a user interacting with the software application in accordance with some pre-planned test cases to validate operation of the software application for those test cases. As time has progressed, many techniques have been developed to automate testing in order to improve the testing speed, thoroughness, and accuracy.

One technique for test automation involves converting manually written test cases into automated tests that can be performed on a software application in an automated manner (e.g. without manual intervention). However, to date, the processes used for this type of test case conversion have been limited. For example, users are still typically required to manually write at least a portion of the automated tests, which is time consuming and prone to error.

There is thus a need for addressing these and/or other issues associated with the prior art.

SUMMARY

As described herein, a system, method, and computer program are provided for automating manually written test cases. In use, a web scraper is used to scrape an application to be tested, wherein the scraping identifies elements of the application. Additionally, a repository is used to store an indication of the elements of the application identified from the scraping of the application. Further, a test case manually written for the application is accessed. One or more of the elements of the application indicated in the repository that are impacted by the manually written test case are then determined. Still yet, one or more of the preconfigured test functions that correspond with the one or more of the elements of the application are selected from a library of preconfigured test functions. Moreover, the manually written test case is automated, to form an automated test case, using the selected one or more of the preconfigured test functions.

DETAILED DESCRIPTION

Figure 1:
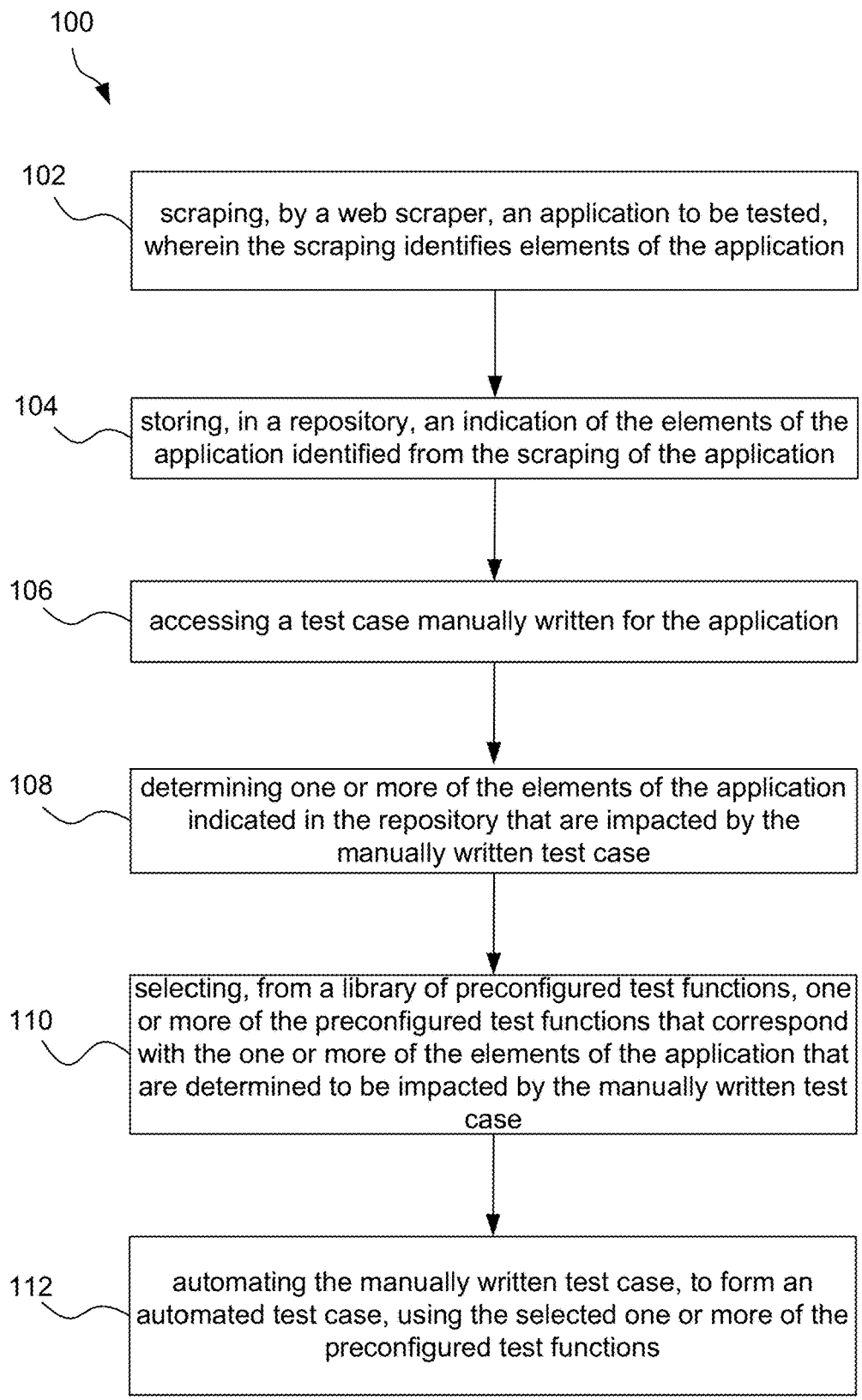
FIG. 1 illustrates a method for automating manually written test cases, in accordance with one embodiment.

FIG. 1 illustrates a method 100 for automating manually written test cases, in accordance with one embodiment. The method 100 may be carried out by any system that includes at least one processor. For example, the method 100 may be carried using the computer system described below with reference to FIG. 5.

As shown in operation 102, a web scraper is used to scrape an application to be tested, wherein the scraping identifies elements of the application. The application is any computer code that performs one or more functions. Thus, the code of the application may be scraped to identify the elements of the application. The scraping may enable all elements of the application to be identified.

In one embodiment, the application may be a web-based application. To this end, the application may include one or more web pages. In this embodiment, the web pages of the application may be scraped for the elements of the application.

The elements of the application may be any components, building blocks, etc. of the application. For example, the elements of the application may be visual elements of the application, such as input fields of the application (e.g. included in the web pages) that are utilized for receiving user input during execution of the application, tables output by the application, etc. As another example, the elements of the application may include data structures created and used during execution of the application.

Additionally, in operation 104, a repository is used to store an indication of the elements of the application identified from the scraping of the application. The indication may include any other information associated with each element. For example, for each element, the repository may store a name of the element, a type of the element, a functionality of the element, a web page on which the element was identified, etc.

Further, in operation 106, a test case manually written for the application is accessed. The test case may be set of steps to be performed for testing at least one aspect of the application. In one example, the test case may correspond to input fields of the application and may involve steps to enter input in the input fields of the application.

The test case may be manually written by a user (e.g. tester, developer, support engineer) in a user interface (e.g. of a testing platform, such as that described below with reference to FIG. 2). As an option, the test case may be manually written by the user as free text. To this end, the test case may be written in any format desired by the user.

In one embodiment, the manually written test case may be accessed responsive to creation of the manually written test case by the user. For example, the manually written test case may be accessed when the user selects an option on the above mentioned user interface to "save" or "upload" the manually written test case. In another embodiment, the manually written test case may be accessed as a part of a batch process, in which case all test cases manually written for the application and saved/uploaded by the user may be accessed for automating such test cases.

In operation 108, one or more of the elements of the application indicated in the repository that are impacted by the manually written test case are determined. The elements of the application that are impacted by the manually written test case (i.e. the impacted elements) may be those elements involved in the steps of the test case.

In one embodiment, the elements of the application that are impacted by the manually written test case may be determined using natural language processing (NPL). For example, NPL may be performed on the manually written test case to determine which of the elements in the repository are impacted by the manually written test case. Optionally, the NPL may identify names or other indicators of the elements that are impacted by the manually written test case, and those identified names or other indicators may be matched to the element indicators stored on the repository, in order to identify the exact elements of the application that are impacted by the manually written test case.

Still yet, in operation 110, one or more of the preconfigured test functions that correspond with the impacted elements of the application are selected from a library of preconfigured test functions. The test functions refer to functions that, when executed, perform one or more operations to test functionality of an application, such as providing input to an input field, initiating the generation of a table or report, etc.

The library of preconfigured test functions may be any library (storage) having preconfigured (i.e. pre-written) test functions. The preconfigured test functions may be specific to the application, in one embodiment. In another embodiment, the preconfigured test functions may be common test functions which are generic to any number of different applications (i.e. can be generically applied to testing of any application).

In one embodiment, the information stored in the repository for the impacted elements may be used to select the corresponding preconfigured test functions. For example, a description and/or type of each impacted element may be matched to information in the library describing preconfigured test functions. Any desired matching algorithm may be used.

In another embodiment, a machine learning algorithm may be used to select the preconfigured test functions that correspond to the impacted elements. The machine learning algorithm may be trained to be able to infer which of the test functions in the library correspond to certain application elements (e.g. elements associated with the application to be tested or other applications). For example, the impacted elements may be input to the machine learning algorithm, and the machine learning algorithm may process the impacted elements to select, from the library, the preconfigured test functions that correspond with the impacted elements. In any case, this selection operation may be performed automatically (i.e. without user intervention).

Moreover, in operation 112, the manually written test case is automated, to form an automated test case, using the selected one or more of the preconfigured test functions. The automated test case may be a test script, in one embodiment. In another embodiment, the manually written test case may be automated by integrating the selected preconfigured test functions into the test script. The integration may be performed based on the manually written test case itself (e.g. a sequence of the steps included in the manually written test) and/or based on dependencies or other rules predefined for preconfigured test functions included in the library.

In this way, the automated test case may be automatically generated for the manually written test case, without requiring user input beyond the initial input of the manually written test case. The method 100 described above may increase the speed at which manually written test cases are converted to automated test cases, by automating the conversion process and avoiding manual processing. The method 100 described above may also provide consistent results, including reducing error otherwise potentially introduced in a manual conversion process.

In further embodiments to the method 100 described above, the automated test case may be stored (e.g. an automated test case repository). For example, the automated test case may be stored in association with an indicator of the application, such that the automated test case may be accessed for each instance of testing the application. In another embodiment, the automated test case may be executed to test the application. In a further embodiment, results of the execution of the automated test case may be output (e.g. in a user interface).

It should be noted that the method 100 may be applied to any number of different manually written test cases for the application, in order to provide automation of those various different manually written test cases. As an option, a scheduler may then be utilized to schedule execution of the automated test case (e.g. in connection with any of the other automated test cases).

In yet another embodiment, for any detected change made to the application (e.g. code change, etc.), the scraping in operation 102 and the storing in operation 104 may be repeated. This may allow the repository of application elements to be updated responsive to any application changes (e.g. updated to store new application elements newly included in the application, remove old application elements no longer included in the application, etc.). In turn, manually written test cases may be correlated with current elements of the application, to ensure that the automated test cases provided by the method 100 correctly apply to the current state (i.e. elements) of the application.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
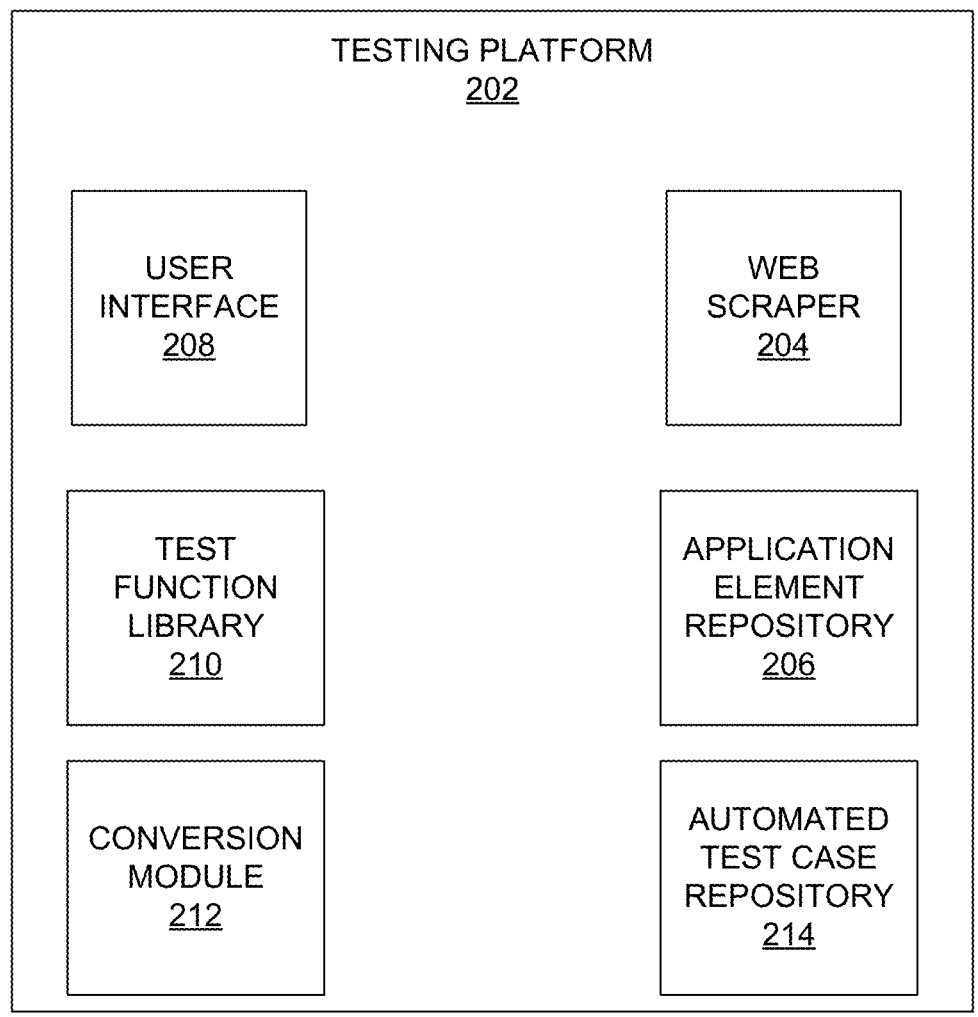
FIG. 2 illustrates a system for automating manually written test cases, in accordance with one embodiment.

FIG. 2 illustrates a system 200 for automating manually written test cases, in accordance with one embodiment. As an option, the system 200 may be implemented in the context of the details of the previous figure and/or any subsequent figure(s). For example, the system 200 may carry out the method 100 of FIG. 1. The system 200 may be a computer system or combination of computer systems, as desired. The system 200 may be located in the cloud, for automating manually written test cases for applications stored on other computer systems. Of course, however, the system 200 may be implemented in the context of any desired environment. Further, the aforementioned definitions may equally apply to the description below.

As shown, the system 200 includes a testing platform 202 that automates manually written test cases. While not shown, it should be noted that the system 200 may also include one or more applications to be tested, which may or may not be remotely stored with respect to the testing platform 202.

The testing platform 202 includes a web scraper 204 (e.g. written in Python) that scrapes an application to be tested to identify elements of the application. The testing platform 202 then stores, in an application element repository 206 (e.g. written in Selenium), an indication of the elements of the application identified from the scraping. The application element repository 206 may be specific to the application, in one embodiment. As an option, the web scraper 204 may be prompted to scrape the application periodically, to update the application element repository 206 with any changes made to elements included in the application. As another option, the web scraper 204 may be prompted to scrape the application after each change made to the application (e.g. as detected by a monitoring module of the testing platform 202 or a component separate from the testing platform 202), in order to ensure that the application element repository 206 remains up-to-date with current elements included in the application.

The testing platform 202 includes at least one user interface 208. In one embodiment, a test case manually written for the application is received through the user interface 208. The user interface 208 may allow a user to input the test case as free text, in one embodiment. The user interface 208 may allow the user to "save" or "upload" the manually written test case to the testing platform 202. While not shown, it should be noted that the testing platform 202 may include a repository for storing manually written test cases.

The testing platform 202 also includes a test function library 210. The test function library 210 stores preconfigured test functions. The preconfigured test functions may be common to various applications, or may even store test functions specific to the application to be tested.

Further, the testing platform 202 includes a conversion module 212. The conversion module 212 may be a software application or other segment of code that automates the manually written test case to form an automated test case. The conversion module 212 accesses the manually written test case, determines elements in the application element repository 206 that are impacted by the manually written test case, selects preconfigured test functions from the test function library 210 which correspond with the impacted elements, and then automates the manually written test case using the selected preconfigured test functions. The conversion module 212 may include a machine learning algorithm to select the preconfigured test functions, in one embodiment. In another embodiment, the conversion module 212 may include rules for integrating the selected preconfigured test functions to form the automated test case.

The testing platform 202 includes an automated test case repository 214 for storing the automated test case and any other automated test cases similarly generated for the application. As an option (not shown), the testing platform 202 may also include a test execution module which executes the automated test cases to test the application, and which reports results of the testing. A scheduler (not shown) of the testing platform 202, or as part of the test execution module, may also be used to schedule execution of the automated test cases. In one embodiment, the user interface 208 may be used to output the results of the testing to the user or any other user of the testing platform 202. As another option, the testing platform 202 may output the automated test cases to a separate test execution platform or application for use in testing the application.

Figure 3:
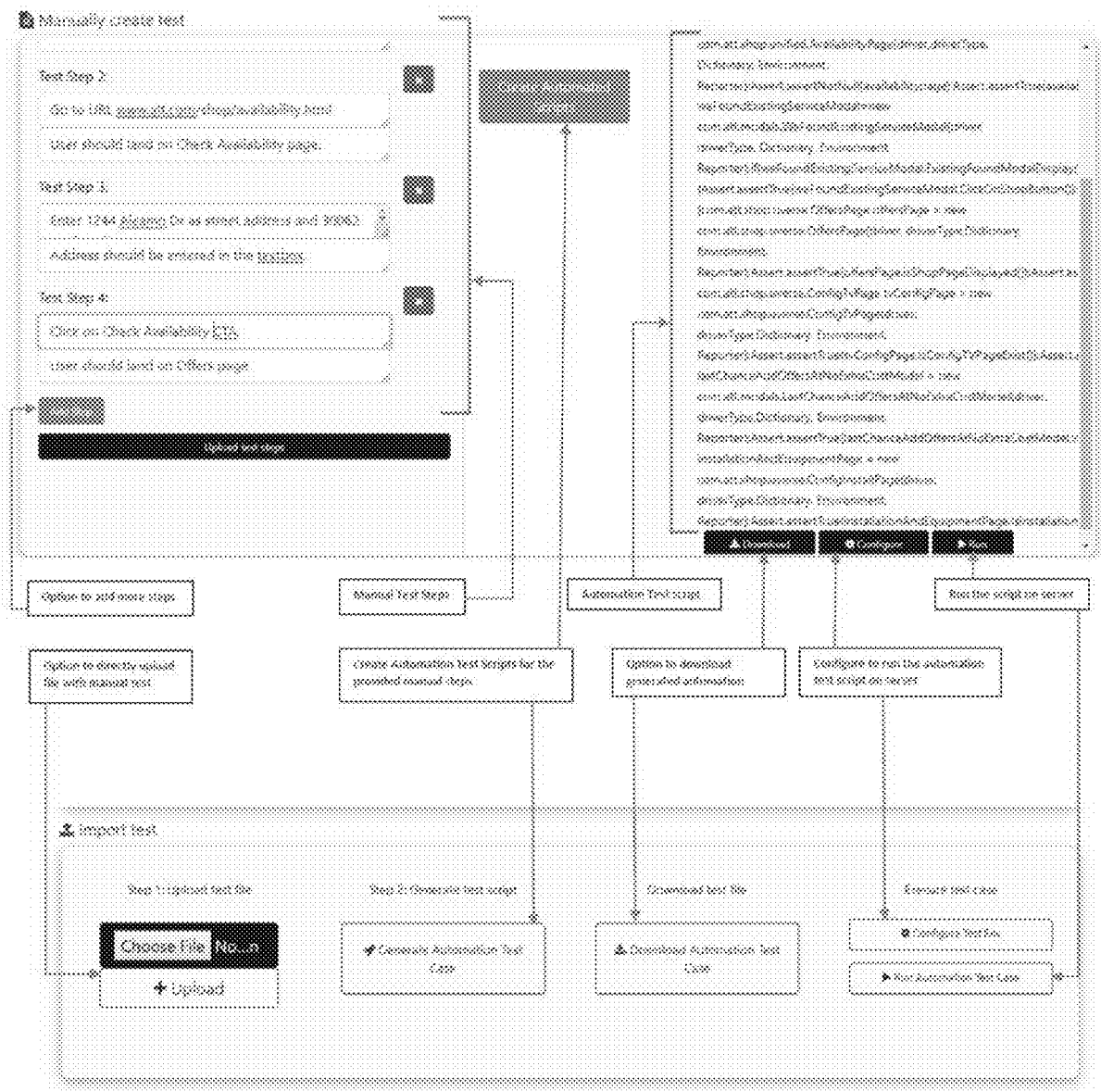
FIG. 3 illustrates a block diagram of a flow for automating manually written test cases, in accordance with one embodiment.

FIG. 3 illustrates a block diagram of a flow for automating manually written test cases, in accordance with one embodiment. The flow may be carried out by the testing platform 202 of FIG. 2, in one embodiment. Of course, however, the flow may be carried out in the context of any desired environment. Further, the aforementioned definitions may equally apply to the description below.

As shown, test steps are manually entered in a user interface for generating a manually written test case to be used for testing an application. In the present example shown, the manually entered test steps relate to entering input in input fields of the application. The user interface also includes an option (i.e. selectable button) for adding more test steps, as desired.

Further, the user interface includes an option for uploading the manually written test case entered in the user interface. In another embodiment, as shown, a user interface may be provided for allowing a user to import a test case manually written in a separate file/document. In either case, the test case may be manually written as free text.

Once uploaded, the user may select an option to create an automated test case (i.e. script) for the manually written test case. In another embodiment, the automated test case may be automatically created responsive to uploading of the manually written test case. The example shown illustrates a portion of code for a possible automated test case. In the embodiment shown, the code of the created automated test case may be presented in a user interface for viewing by the user.

The user interface presenting the automated test case code includes an option to download (i.e. save) the automated test case. This user interface also includes an option to configure the automated test case for execution on a server (i.e. to test the application). This configuration may relate to a test environment in which the automated test case is to be run. The test environment may relate to a hardware environment in which the automated test case is to be run, a software environment in which the automated test case is to be run, etc. The user interface further includes an option to run the automated test case (e.g. within the configured test environment).

Figure 4:
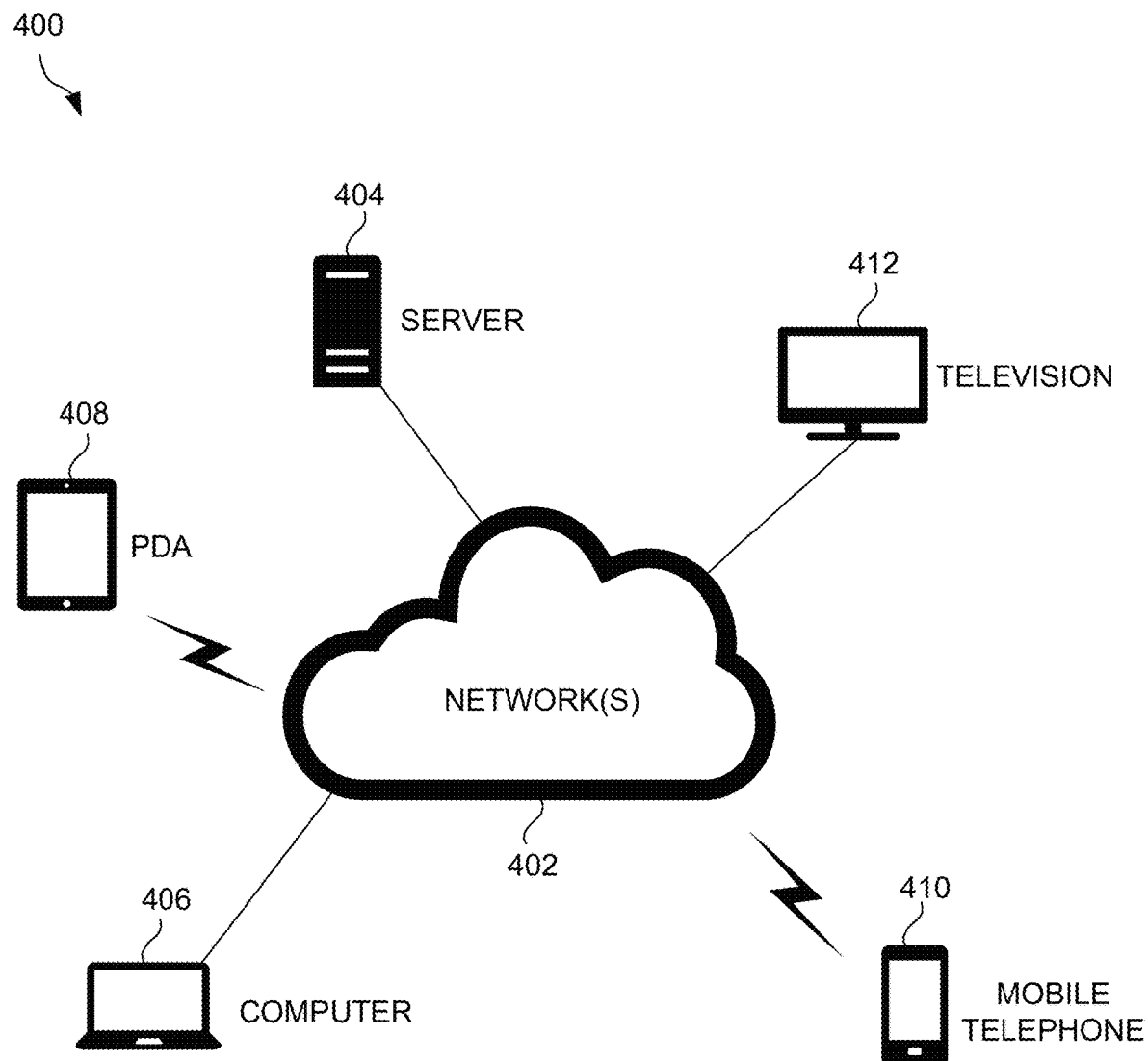
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
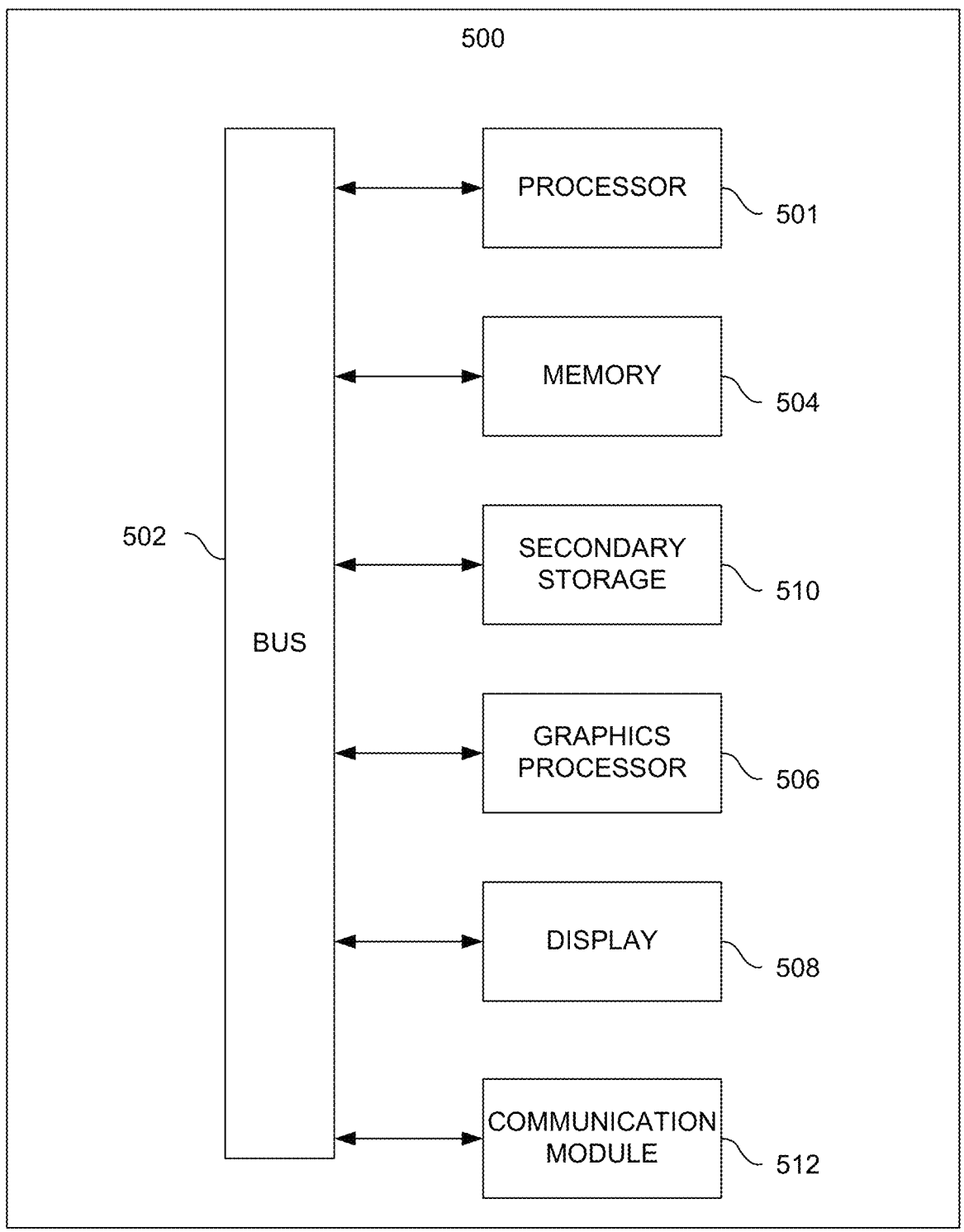
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
    scraping, by a web scraper, an application to be tested, wherein the scraping identifies visual elements of the application;
    storing, in a repository, an indication of the visual elements of the application identified from the scraping of the application, the indication including, for each of the visual elements, a name of the visual element, a type of the visual element, and a description of the visual element;
    accessing a test case manually written for the application, the test case including steps to test at least a subset of the visual elements of the application;
    determining one or more of the visual elements of the application indicated in the repository that are impacted by the manually written test case, including:
        performing natural language processing on the manually written test case to identify element indicators included in the manually written test case, the element indicators included in the manually written test case corresponding to the at least a subset of the visual elements of the application tested in the steps of the manually written test case, and
        matching the element indicators included in the manually written test case to one or more element indicators stored in the repository for the visual elements of the application as a result of the scraping of the application;
    selecting, from a library of preconfigured test functions, one or more of the preconfigured test functions that correspond with the one or more of the visual elements of the application that are determined to be impacted by the manually written test case, wherein information stored in the repository in association with the one or more element indicators is used to select the one or more of the preconfigured test functions from the library, and wherein the one or more of the preconfigured test functions are selected by:
        determining, from the repository, the description and the type of each visual element of the one or more of the visual elements of the application that are determined to be impacted by the manually written test case, and
        matching the description and the type of each visual element of the one or more of the visual elements to at least one of the one or more of the preconfigured test functions included in the library; and
    automating the manually written test case, to form an automated test case, using the selected one or more of the preconfigured test functions by:
        determining dependencies predefined for the selected one or more of the preconfigured test functions, and
        integrating the selected one or more of the preconfigured test functions into a test script, in accordance with the dependencies.

2. The non-transitory computer readable medium of claim 1, wherein the scraping identifies all visual elements of the application.

3. The non-transitory computer readable medium of claim 1, wherein the application is a web-based application.

4. The non-transitory computer readable medium of claim 3, wherein
    scraping the application includes scraping one or more web pages forming the application.

5. The non-transitory computer readable medium of claim 1, wherein the visual elements include:
    input fields of the application utilized for receiving user input, and
    tables output by the application.

6. The non-transitory computer readable medium of claim 1, wherein the test case is manually written as free text.

7. The non-transitory computer readable medium of claim 1, wherein the test case is manually written by a user in a user interface of a testing platform.

8. The non-transitory computer readable medium of claim 7, wherein the manually written test case is accessed responsive to creation of the manually written test case by the user.

9. The non-transitory computer readable medium of claim 8, further comprising:
    responsive to forming the automated test case, presenting code of the automated test case in another user interface for viewing by the user;
    wherein the other user interface includes:
    a first option to download the automated test case,
    a second option to configure the automated test case for execution in a test environment in which the automated test case is to be executed, and
    a third option to execute the automated test case within the test environment.

10. The non-transitory computer readable medium of claim 1, further comprising:
    storing the automated test case.

11. The non-transitory computer readable medium of claim 1, further comprising:
    executing the automated test case to test the application.

12. The non-transitory computer readable medium of claim 11, wherein a scheduler is utilized to schedule execution of the automated test case.

13. The non-transitory computer readable medium of claim 11, further comprising:
    outputting results of the execution of the automated test case.

14. The non-transitory computer readable medium of claim 1, further comprising:
    detecting a change to the application; and
    repeating the scraping and the storing responsive to detecting the change to the application.

15. The non-transitory computer readable medium of claim 1, further comprising:
    accessing a second test case manually written for the application;
    determining a second set of the visual elements of the application indicated in the repository that are impacted by the second manually written test case;
    selecting, from the library of preconfigured test functions, a second set of the preconfigured test functions that correspond with the second set of the visual elements of the application that are impacted by the second manually written test case; and
    automating the second manually written test case, to form a second automated test case, using the selected second set of the preconfigured test functions.

16. A method, comprising:
    scraping, by a web scraper, an application to be tested, wherein the scraping identifies visual elements of the application;

storing, in a repository, an indication of the visual elements of the application identified from the scraping of the application, the indication including, for each of the visual elements, a name of the visual element, a type of the visual element, and a description of the visual element;

accessing a test case manually written for the application, the test case including steps to test at least a subset of the visual elements of the application;

determining one or more of the visual elements of the application indicated in the repository that are impacted by the manually written test case, including:

performing natural language processing on the manually written test case to identify element indicators included in the manually written test case, the element indicators included in the manually written test case corresponding to the at least a subset of the visual elements of the application tested in the steps of the manually written test case, and matching the element indicators included in the manually written test case to one or more element indicators stored in the repository for the visual elements of the application as a result of the scraping of the application;

selecting, from a library of preconfigured test functions, one or more of the preconfigured test functions that correspond with the one or more of the visual elements of the application that are determined to be impacted by the manually written test case, wherein information stored in the repository in association with the one or more element indicators is used to select the one or more of the preconfigured test functions from the library, and wherein the one or more of the preconfigured test functions are selected by:

determining, from the repository, the description and the type of each visual element of the one or more of the visual elements of the application that are determined to be impacted by the manually written test case, and matching the description and the type of each visual element of the one or more of the visual elements to at least one of the one or more of the preconfigured test functions included in the library; and automating the manually written test case, to form an automated test case, using the selected one or more of the preconfigured test functions by:

determining dependencies predefined for the selected one or more of the preconfigured test functions, and integrating the selected one or more of the preconfigured test functions into a test script, in accordance with the dependencies.

17. A system, comprising:

a non-transitory memory storing instructions; and one or more processors in communication with the non-transitory memory that execute the instructions to perform a method comprising:

scraping, by a web scraper, an application to be tested, wherein the scraping identifies visual elements of the application;

storing, in a repository, an indication of the visual elements of the application identified from the scraping of the application, the indication including, for each of the visual elements, a name of the visual element, a type of the visual element, and a description of the visual element;

accessing a test case manually written for the application, the test case including steps to test at least a subset of the visual elements of the application;

determining one or more of the visual elements of the application indicated in the repository that are impacted by the manually written test case, including:

performing natural language processing on the manually written test case to identify element indicators included in the manually written test case, the element indicators included in the manually written test case corresponding to the at least a subset of the visual elements of the application tested in the steps of the manually written test case, and matching the element indicators included in the manually written test case to one or more element indicators stored in the repository for the visual elements of the application as a result of the scraping of the application;

selecting, from a library of preconfigured test functions, one or more of the preconfigured test functions that correspond with the one or more of the visual elements of the application that are determined to be impacted by the manually written test case, wherein information stored in the repository in association with the one or more element indicators is used to select the one or more of the preconfigured test functions from the library, and wherein the one or more of the preconfigured test functions are selected by:

determining, from the repository, the description and the type of each visual element of the one or more of the visual elements of the application that are determined to be impacted by the manually written test case, and matching the description and the type of each visual element of the one or more of the visual elements to at least one of the one or more of the preconfigured test functions included in the library; and automating the manually written test case, to form an automated test case, using the selected one or more of the preconfigured test functions by:

determining dependencies predefined for the selected one or more of the preconfigured test functions, and integrating the selected one or more of the preconfigured test functions into a test script, in accordance with the dependencies.

\* \* \* \* \*